United States Patent [19]
Gerhardt

[11] Patent Number: 5,542,357
[45] Date of Patent: Aug. 6, 1996

[54] LINEAR TURBINE PROPULSION SYSTEM

[75] Inventor: Heinz A. Gerhardt, Redondo Beach, Calif.

[73] Assignee: Northrop Grumman Corporation, Los Angeles, Calif.

[21] Appl. No.: 210,858

[22] Filed: Mar. 18, 1994

[51] Int. Cl.$^6$ .................................................. B61C 5/00
[52] U.S. Cl. ........................ 105/64.2; 104/23.2; 104/155
[58] Field of Search ..................................... 104/155, 157, 104/158, 23.1, 23.2; 105/63, 64.1, 64.2

[56] References Cited

U.S. PATENT DOCUMENTS

| | | |
|---|---|---|
| 553,622 | 1/1896 | Lighthall . |
| 969,772 | 9/1910 | Cobb . |
| 1,411,597 | 4/1922 | Trask . |
| 2,606,725 | 8/1952 | Dreibelbis ................................ 244/63 |
| 2,717,744 | 9/1955 | Birnbaum ................................ 244/63 |
| 2,737,357 | 3/1956 | Ringleb ................................... 244/63 |
| 2,869,479 | 1/1959 | Hutchinson .............................. 104/155 |
| 2,971,473 | 2/1961 | Raynaud ................................. 104/23.2 |
| 3,013,505 | 12/1961 | Burke, Jr. ............................... 104/134 |
| 3,242,876 | 3/1966 | Berggren ................................ 104/134 |
| 3,444,823 | 5/1969 | Akmentin ................................ 105/64 |
| 3,467,024 | 9/1969 | Broniewski et al. .................... 104/134 |
| 3,498,234 | 3/1970 | Roumejon ............................... 104/23 |
| 3,527,170 | 9/1970 | Witmer .................................... 104/89 |
| 3,534,689 | 10/1970 | Barthalon ................................ 104/89 |
| 3,540,378 | 11/1970 | Giraud .................................... 104/23 |
| 3,543,685 | 12/1970 | Rosciszewski ......................... 104/23 |
| 3,547,042 | 12/1970 | O'Connor ............................... 104/155 |
| 3,566,797 | 3/1971 | Giraud .................................... 104/120 |

(List continued on next page.)

FOREIGN PATENT DOCUMENTS

| | | |
|---|---|---|
| 966602 | 10/1950 | France . |
| 1800325 | 6/1969 | Germany . |
| 2228885 | 12/1973 | Germany . |
| 662297 | 4/1964 | Italy . |

OTHER PUBLICATIONS

"Tracked Air–Cushion Research Vehicle", Grubelich, G., MECHANICAL ENGINEERING, vol. 94, No. 5, May, 1972, pp. 21–27.

"Impulse–Jet Transportation Systems", Mouritzen, G., ASME Rail Transporting Division, MECHANICAL ENGINEERING, vol. 94, No. 2, Feb. 1972, pp. 12–17.

Primary Examiner—Mark T. Le
Attorney, Agent, or Firm—Terry J. Anderson; Karl J. Hoch, Jr.

[57] ABSTRACT

Propulsion apparatus for a transportation system vehicle. At least one gas producer is mounted on the vehicle for discharging a propulsive fluid stream. The propulsive fluid stream is directed against at least one longitudinally extending linear turbine assembly to propel the vehicle. A manifold delivers the propulsive fluid stream to the linear turbine assembly. A plenum beneath the vehicle receives the propulsive fluid stream from the linear turbine assembly to support the vehicle on a gascushion. Each linear turbine assembly includes cooperating nozzle blades and turbine blades mounted on the vehicle. Each nozzle blade has a longitudinal axis which is transverse of the fluid stream, the longitudinal axes of the nozzle blades all being substantially parallel to one another and to the longitudinal axes of each of the turbine blades, all of the turbine blades being substantially equally spaced from the nozzle blades. A plurality of ground-based stator blades having longitudinal axes which are substantially parallel to and equally spaced from the turbine blades and from the nozzle blades are positioned intermediate the turbine blades and the nozzle blades. In another embodiment, two linear turbine assemblies are oppositely directed and a valve assembly receives and selectively directs the propulsive fluid stream to a first linear turbine assembly to propel the vehicle in a forward direction and to a second, oppositely-directed linear turbine assembly to propel the vehicle in a reverse direction. In another embodiment, the vehicle includes laterally extending reverse flow nozzles mounted to the base of the vehicle above the plenum for selectively receiving the propulsive fluid stream to generate reversing or braking forces.

18 Claims, 11 Drawing Sheets

U.S. PATENT DOCUMENTS

| | | | |
|---|---|---|---|
| 3,580,181 | 5/1971 | Bertin et al. | 104/23 FS |
| 3,583,324 | 6/1971 | Bertin | 104/23.2 |
| 3,586,382 | 6/1971 | Pitkanen | 104/23.2 |
| 3,595,172 | 7/1971 | Veldhuizen | 104/23 FS |
| 3,602,147 | 8/1971 | Hart | 104/23 FS |
| 3,603,261 | 9/1971 | Mann | 104/23 FS |
| 3,618,529 | 11/1971 | Bertin | 104/23 FS |
| 3,648,620 | 3/1972 | Bertin et al. | 105/63 |
| 3,678,860 | 7/1972 | Van Veldhuizen | 104/23 FS |
| 3,695,382 | 10/1972 | Schmitt et al. | 180/116 |
| 3,703,869 | 11/1972 | Randell | 104/23 FS |
| 3,718,096 | 2/1973 | Bloomfield et al. | 104/23.2 |
| 3,722,424 | 3/1973 | Van Veldhuizen | 104/23 FS |
| 3,815,866 | 6/1974 | Wirth | 251/25 |
| 3,820,468 | 6/1974 | Simon | 104/23 FS |
| 3,854,403 | 12/1974 | Bliss | 104/23 FS |
| 3,854,418 | 12/1974 | Bertin | 105/29 R |
| 3,863,727 | 2/1975 | Michrina | 180/5 R |
| 3,875,856 | 4/1975 | Meeker | 104/23 FS |
| 3,889,602 | 6/1975 | Barber | 104/23 FS |
| 3,939,776 | 2/1976 | Ross et al. | 104/23.2 |
| 3,952,666 | 4/1976 | Gladish | 104/23 FS |
| 3,985,081 | 10/1976 | Sullivan, II. | 104/23 FS |
| 4,063,611 | 12/1977 | Anderson | 180/119 |
| 4,085,681 | 4/1978 | Barber | 104/23 FS |
| 4,175,637 | 11/1979 | Bertelsen | 180/128 |
| 4,347,791 | 9/1982 | Mandros | 104/156 |
| 4,550,663 | 11/1985 | DeViaris | 104/119 |

FIG. 4.
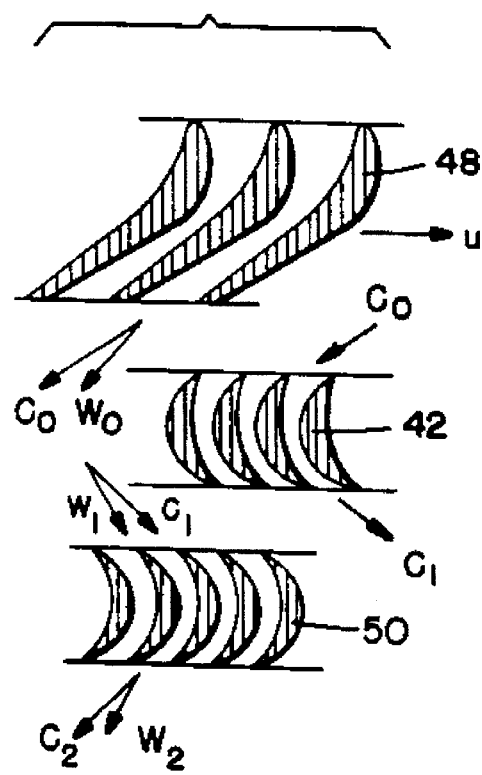
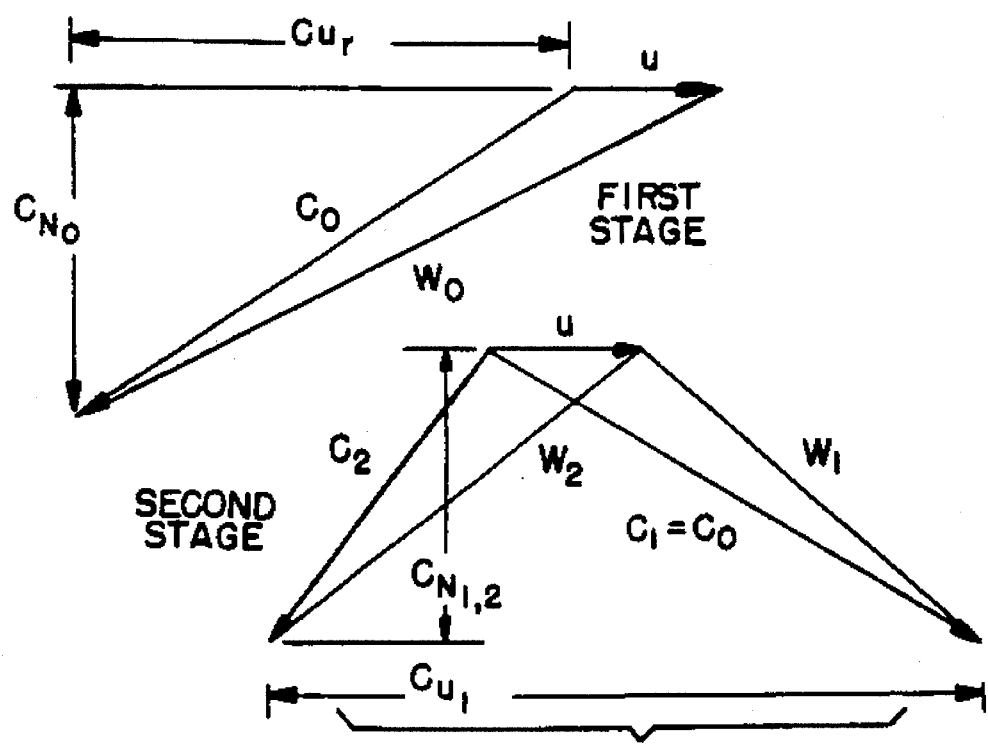
FIG. 4A.

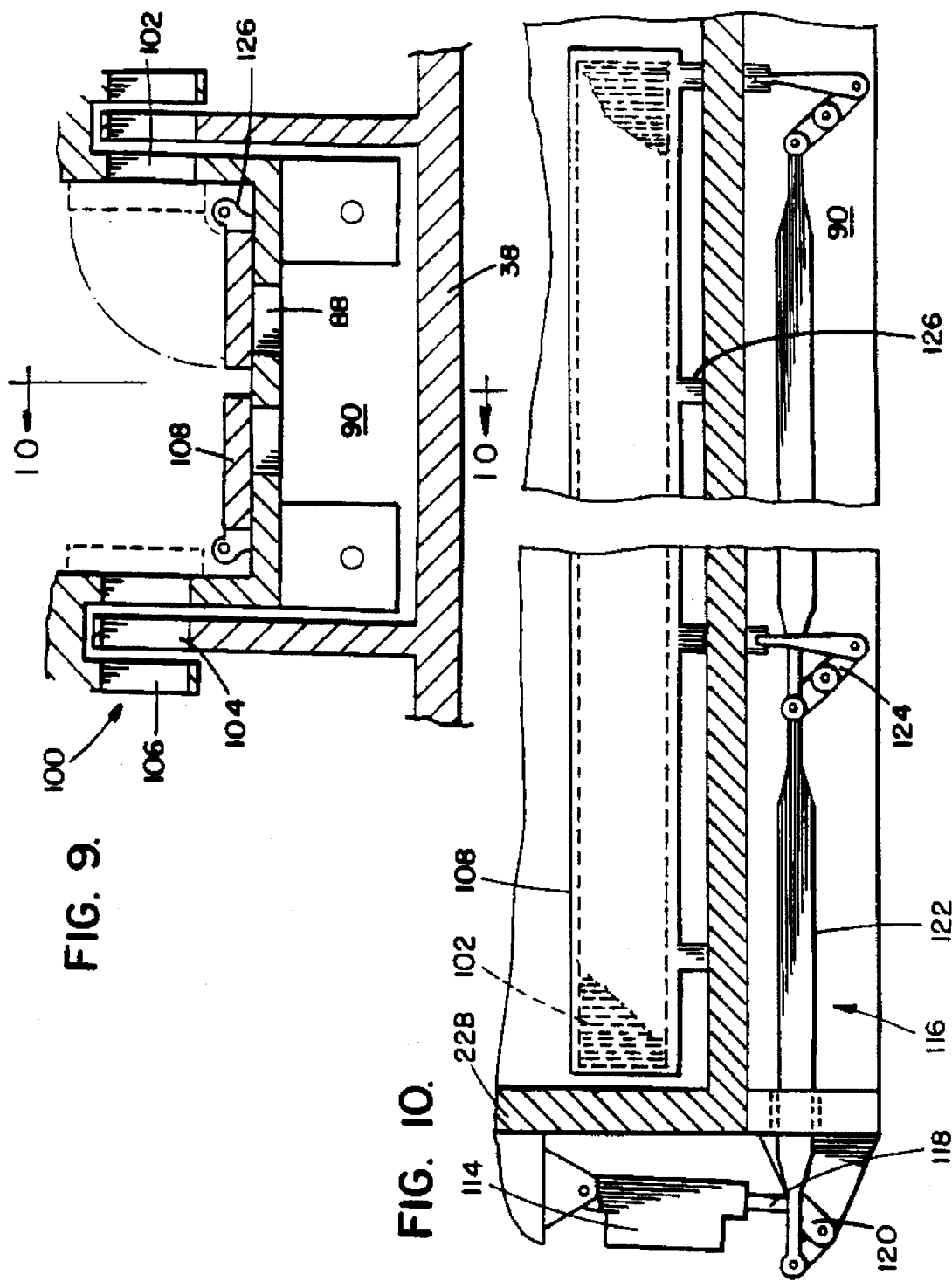

LINEAR TURBINE PROPULSION SYSTEM

BACKGROUND OF THE INVENTION

1. Field of the Invention

The present invention relates generally to ground transportation systems and, more particularly, to an improved propulsion system for mass transit vehicles which utilizes linear turbine drive apparatus.

2. Description of the Prior Art

Many types of propulsion units have been proposed for use with high speed rail vehicles. A typical arrangement for driving a high speed rail vehicle utilizes a suitable diesel engine or a conventional electric motor that directly drives the wheels of the vehicle. While these arrangements provide generally acceptable performance for low and moderately high speeds, they are impractical for very high speeds, for example, in excess of 200 miles per hour. The reason for this is that extremely smooth and precise tracks are required for passenger ride comfort and adequate power transfer from the wheels to the track, thereby necessitating extensive and continuous track maintenance.

High speed trains presently under development, especially those in the magnetic levitation (MAGLEV) category, are propelled by electric linear motors while magnetic levitation provides guidance and smooth suspension. These high-speed trains require very large investments in guideway construction and associated electric power systems. The electric power systems (consisting of power lines alongside the track and feeder lines from centralized power plants, a.c. frequency converters and speed control stations at intervals along the track, and the active part of the linear electric motor installed in the track) are a major portion of the total guideway cost. In contrast, the cost of the vehicles, even when incorporating sophisticated technologies such as MAGLEV, is a relatively small portion of the total transport system cost. There is, therefore, an economic incentive to replace the electric propulsion system with an on-board propulsion system to make the vehicle less dependent on ground-based infra-structure and more autonomous in propulsion, levitation and guidance.

The economic payoff of a self-contained propulsion system increases with increasing transit distances. Present-day railroad systems corroborate that argument: short-range transit systems typically utilize external electric power, whereas long-range transportation systems utilize autonomous propulsion in form of Diesel locomotives.

The linear turbine drive of the present invention is a propulsion system largely contained within the vehicle and as such provides the desired autonomy in operation. It can also provide indigenous levitation by producing a gascushion.

The linear turbine drive consists of an onboard gas generator, typically an aeronautical fan/jet engine unit, and turbomachinery components oriented in line with the track. Some of the components—a row of nozzle blades and a row of turbine blades—are indigenous to the vehicle. The exhaust stream from the nozzles produces the initial thrust force. A gas deflector rail, the linear equivalent of a stator blade stage in a rotary turbine, is attached to the track. The gas deflector rail is a fence-like structure extending along the track in which the pickets consist of flow turning blades. It serves to deflect into a forward direction the gas stream which was exhausted by the nozzles into a nearly backward direction. The stream is directed into the vehicle-mounted turbine blades to produce additional forward thrust which is of a similar magnitude as the thrust produced by the nozzles. The propulsion system may also include turbine components having an opposite orientation for the purpose of producing reverse thrust for braking and vehicle motion reversal. Control gates are used to selectively operate the propulsion system in the forward or reverse thrust mode. The exhaust from the linear turbine system can also be used in a gascushion providing levitation for the vehicle.

There are a number of patents which disclose railway vehicles utilizing the reaction of gas streams for the purpose of propulsion. They fall into two categories: (I) those where the propulsive gas stream is generated on-board; and, (II) those where the propulsive gas stream is supplied from an external source, e.g. by pipeline and compressors installed along the track. The present invention falls into the first category along with patents U.S. Pat No. 3,547,042 to O'Connor, and U.S. Pat. No. 2,869,479 to Hutchinson.

Patents in the second category include U.S. Pat. No. 4,085,681 to Barber; U.S. Pat. No. 3,242,876 to Berggren; U.S. Pat. No. 3,718,096 to Bloomfield et al.; U.S. Pat. No. 2,228,885 (German file number) to Gantzer; U.S. Pat. No. 3,540,378 to Giraud; U.S. Pat. No. 3,815,866 to Wirth. These patents (with the exception of Bloomfield) combine fluid reaction type propulsion with gas-cushion levitation. Mouritzen's paper entitled "Impulsive-Jet Transportation Systems" published in Mechanical Engineering, Vol. 94, No. Feb. 2, 1972, pages 12–17, also deals with an external high-pressure-air power system.

The Category II systems require a complicated valving system in the pipe network which must be actuated to supply the high pressure air only at the instant the train is passing a particular valve. To minimize gas flow losses these valves must be rather closely spaced. An essential distinguishing feature of the inventions of Category II, however, is that the external power supply does not provide the desired autonomy in propulsion and the associated low cost of construction which is the aim of the present invention.

The patents under Category I, inasmuch as propulsion autonomy can be claimed for them, shall therefore be distinguished from the present invention in more detail. U.S. Pat. No. 2,869,479 to Hutchinson, while based on general fluid stream reaction principles, does not contain turbine-type blades. Instead, Hutchinson describes a multitude of vehicle-based and ground-based conduits which duct the propulsive gas stream backwards from vehicle to ground back to vehicle and so on in a vertically and horizontally undulating flow path. His vehicle is shown to be riding on wheels.

O'Connor's U.S. Pat. No. 3,547,042 has in common with the present invention a fence-like, track-mounted gas deflector rail. However, the vehicle based components of the propulsion system are configured quite differently. The O'Connor system consists of a four stage arrangement of curved vanes with two stages operating on the reaction principle and two stages on the impulse principle. The propulsive gas stream traverses the flow deflector rail from opposing directions in succession. Other distinguishing features of the O'Connor system are the variable incidence nozzle vanes controlling the gas stream in both magnitude and direction simultaneously and which open and close to supply and shut off gas flow to the gas deflector rail. Reverse motion is achieved only to a limited extent and ineffectually, since thrust has already been generated in the first two stages by exhausting the gas forward through louvers in the front end of the duct. When the vehicle is stopped, the engine is set to idle and the blades of the power head are pivoted to the closed position to shut off gas flow across the reaction rail. While idling, the gas flow is discharged overboard through a duct controlled by a valve. The power head unit also requires its own support to ensure the necessary precise alignment of the turbine components operating on the reaction principle. The power head is therefore independently supported, preferably on an air cushion.

It will be recognized that the previously cited references disclose complex systems which would be expensive to manufacture and maintain and hence could not compete with current solutions.

SUMMARY OF THE INVENTION

The present invention, then, relates to a propulsion apparatus for ground-based tracked vehicles comprising a gas turbine mounted on the vehicle which produces a high-pressure, high-temperature propulsive gas stream. A linear turbine assembly converts the kinetic energy of the gas stream into thrust to propel the vehicle, and selectively into reverse thrust for purposes of braking and reversing the motion of the vehicle. The turbine exhaust consisting of low-pressure, low-temperature gas can be used to maintain a gas cushion underneath the vehicle to provide levitation without mechanical friction.

Throughout this specification, a distinction is made between "fixed" and "moving" components of the linear turbine propulsion system. As used herein, the term "fixed" and equivalent terms thereto shall refer to components which are attached, connected to, or mounted upon the ground or to the track structure, i.e. are stationary relative to a ground-based reference system. As used herein, the term "moving" and equivalent terms thereto shall refer to components which are attached, connected to, or mounted upon the vehicle and move with the vehicle along the track.

The linear turbine components moving with the vehicle include a gas generator (a turbojet or, preferably, a turbofan engine), a manifold incorporating a series of gas exhaust nozzle blades, and one or more sets of turbine blades. The nozzle and turbine blades are rigidly mounted in rectangular frames with the frame plane aligned with direction of the vehicle movement. The ground-based components consist of one or more continuous rows of flow deflecting stator blades, also rigidly mounted in rail members extending along the track, which are spaced intermediate the nozzle blades and turbine blades. The flow deflecting stator blades are the equivalent of rotary turbine stator blades.

The nozzle blades and turbine blades are similar in shape to their corresponding components in rotary turbines. The longitudinal axes of the nozzle, stator, and turbine blades are substantially parallel to each other and typically extend in a vertical direction. The mean direction of the propulsive gas stream is perpendicular to the blade axes and transverse to the vehicle motion. The blades in each row are equally spaced.

The nozzle blades direct the exhaust substantially backward and thereby generate thrust as a driving force for the vehicle. Thus, the moving nozzles constitute the first stage of the linear turbine. Additional propulsive forces are extracted from the gas stream exiting the nozzle blades by redirecting it successively through the stationary flow deflecting stator blades and into the moving turbine blades. In each stage the gas velocity vector is reduced by a vector component of the vehicle velocity.

It is of interest to note that, in extending rotary turbine features to the linear turbine design, a role reversal takes place between moving and stationary components: nozzles which are stationary in rotary designs become moving, turbine blades become stator blades, and vice versa. A two-stage rotary turbine comprises two stationary components, the nozzle and the stator blade assemblies, and two moving components, the two turbine wheels. A two-stage linear turbine consists of only three components, the moving nozzle blade assembly, the moving turbine blade assembly, and the ground-based rail member positioned therebetween with its array of stator blades. Additional stages which may be desirable in certain circumstances, for instance when the vehicle has to ascend steep gradients, would consist of two components each: another fixed rail member with its included stator blades on the track and another assembly of moving turbine blades mounted on the vehicle.

The linear turbine is a "free turbine" inasmuch as it is not mechanically coupled to the gas generator. Therefore, the gas generator can be run up to maximum power before brake release to ensure maximum acceleration at the start of travel. Also, turbines develop their maximum force at low speeds which, together with the free turbine characteristics, provides an excellent response to changing speed conditions.

The basic linear turbine components can be arranged in a variety of configurations. In one embodiment (FIG. 6), two linear turbine assemblies are configured for opposite actions. A valve mechanism receives and selectively directs the gas stream to the first linear turbine assembly, in one instance, to propel the vehicle in a forward direction. In another instance, the gas stream is directed to the second oppositely-oriented linear turbine assembly to retard the vehicle's motion or to propel it in reverse direction. In another embodiment (FIG. 7) opposing twin linear turbine assemblies are supplied with the propulsive fluid stream from a central manifold to produce propulsive forces, and the fluid stream is selectively diverted by a valve from the manifold downwardly through a series of horizontally-oriented nozzle blades to produce reversing or braking forces.

In a further embodiment dual gas-generator and linear turbine assemblies are mounted on either side of the vehicle. Both systems direct the exhaust inward into a plenum which defines the chamber of a gascushion used to levitate the vehicle. Gascushion levitation is an advantageous complement to the linear turbine drive system inasmuch as it also provides autonomy of vehicle operation desired for the total system.

In yet another embodiment the linear turbine drive system is applied to a vehicle incorporating magnetic levitation and guidance systems. This combination is favored for two reasons: (1) the magnetic suspension and guidance system is an indigenous component of the vehicle powered by energy stored or generated on board, and thus fulfills the requirement of autonomy; and, (2) the magnetic suspension system provides precise vehicle guidance with respect to the track and thus ensures proper alignment of the linear turbine components.

In still another embodiment the linear turbine drive system is embodied in a vehicle incorporating conventional wheel-on-rail ground support apparatus.

The linear turbine drive is quite superior in terms of propulsive unit size, weight and fuel consumption as compared to vehicle propulsion attained in aeronautical fashion directly from fanjet engine thrust. In fact, the linear turbine drive can even be more economical in terms of fuel energy-to-propulsion power conversion than electric linear motor drives. The linear turbine drive also excels in reduced noise emissions as the exhaust velocities are substantially reduced compared to the direct exhaust from a fanjet engine.

These facts have been recognized by the present invention. Thus, a linear turbine drive is an economical and self-sufficient propulsion system for high speed guided surface vehicles. It represents an alternative to other contemporary propulsion systems including the turboshaft-driven propeller envisioned for air levitated vehicles and the linear electric motor presently envisioned for magnetically-levitated vehicles.

A primary object of the present invention is a propulsion system for high-speed ground transport vehicles utilizing the linear turbine drive concept and thereby enabling the vehicle to operate autonomously and independently of the supply of external power.

Another important object is the combination of a linear turbine drive with a gas cushion to provide the vehicle with both propulsion and levitation utilizing the exhaust flow from a common gas turbine power plant.

An alternate object is the combination of a linear turbine propulsion system with a magnetic levitation and guidance system.

Another object is the combination of a linear turbine propulsion system with a wheel-on-rail ground support.

Still another object of the invention is the provision of a transportation system in which a vehicle is disposed on a guideway of novel construction which incorporates a longitudinally extending rail component for interaction with associated components on the vehicle, all utilized primarily in propelling and secondarily in levitating the vehicle.

Another object of the invention is the provision of the transportation system which is adaptively used either on the ground surface, elevated above the ground, or disposed below ground level as a subway, all with equal facility.

Still a further object of the invention is to provide a linear turbine mechanism for propelling a transport vehicle which is capable, selectively, of forward movement, braking, and movement in a reverse direction.

Still a further object of the invention is the provision of a mass transportation system which utilizes a means of propulsion which can be built, operated, and maintained at relatively low cost and which is highly efficient in operation, rugged in construction, and durable in use.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of the invention, illustrate embodiments of the invention and, together with the description, serve to explain the principles of the invention in general terms. Like numerals refer to like parts throughout the disclosure.

BRIEF DESCRIPTION OF THE DRAWINGS

FIG. 4 is a diagrammatic view of the nozzle, stator, and turbine blades illustrated in FIG. 3A;

FIG. 4A is a pair of velocity vector diagrams related to the components illustrated in FIG. 4;

FIG. 9 is a detail cross section view generally along lines 9—9 in FIG. 8 illustrating part of the construction of FIG. 7 in greater detail;

FIG. 10 is a cross section view generally along lines 10—10 in FIG. 9 of certain parts illustrated in FIG. 8, certain parts being cut away for clarity;

DETAILED DESCRIPTION OF THE PREFERRED EMBODIMENTS

Figure 1:
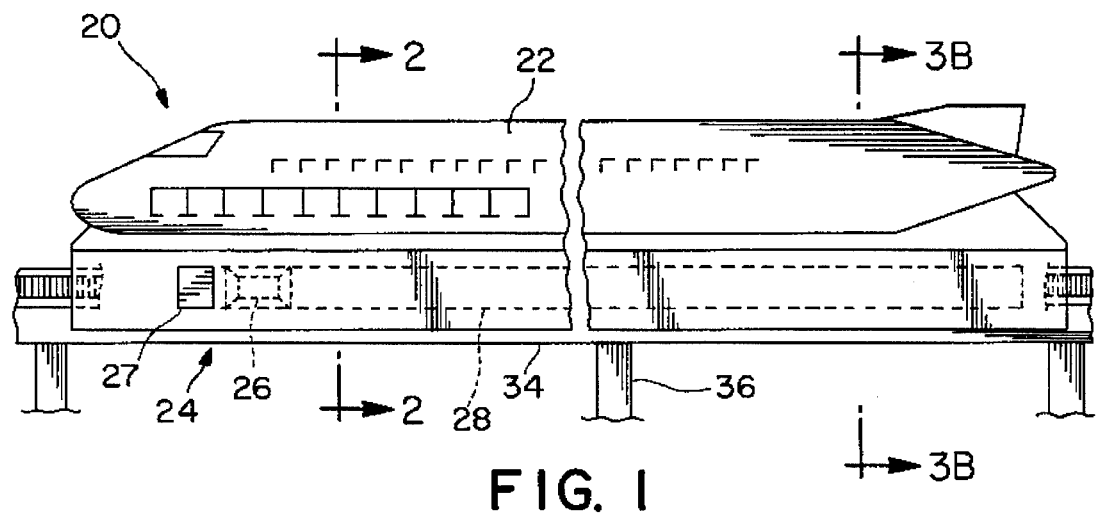
FIG. 1 is a side elevation view of a mass transportation system including a mass transit vehicle which embodies the present invention.

Turn now to the drawings and, initially, to FIGS. 1–4 which illustrate propulsion apparatus according to the invention as applied to a ground transportation system 20. The ground transportation system 20 utilizes a mass transit vehicle 22 which may be in the nature of a train capable of movement along a supporting and guiding track structure 24. The track structure 24 includes a base member 34 which may be mounted on the ground or elevated on a plurality of longitudinally spaced upright columns 36.

A suitable gas producer 26 is mounted on each side of the vehicle 22, each gas producer 26 generating and discharging a propulsive gas stream. Each gas producer receives intake air through inlet 27 and exhausts its propulsive fluid stream into manifold 28.

The gas producer 26 may be a turbojet engine but, preferably, would be a turbofan engine. A turbojet engine, typically with a bypass ratio (BPR) of 0.125, would operate with a lower mass flow and therefore minimize the linear turbine flow path and blade dimensions. However, since the gas supply pressure (nozzle pressure ratio) is high, multiple turbine stages would be required to achieve high efficiencies. On the other hand, at very high bypass ratios, mass flow is too high and nozzle pressure ratios are too low for a feasible linear turbine design.

There exists, therefore, a gas generator cycle of a certain bypass ratio which provides optimum conditions for a linear turbine drive which will be described below in greater detail. As the subsequent analysis shows, bypass ratios in the range of 1.0 to 2.0 are compatible with a two-stage design, i.e. the moving nozzle plus one set of ground-based stators plus one set of moving turbine blades. Further advantages of moderate bypass propulsion systems are low exhaust temperatures and noise levels compared to those using turbojet gas generators.

Therefore, fan engines developed for aircraft propulsion are quite suitable as powerplants for the linear turbine drive of the invention. Such a propulsion system may actually be more economical than propulsion by linear electric motor as the subsequent performance analysis will show.

Figure 2:
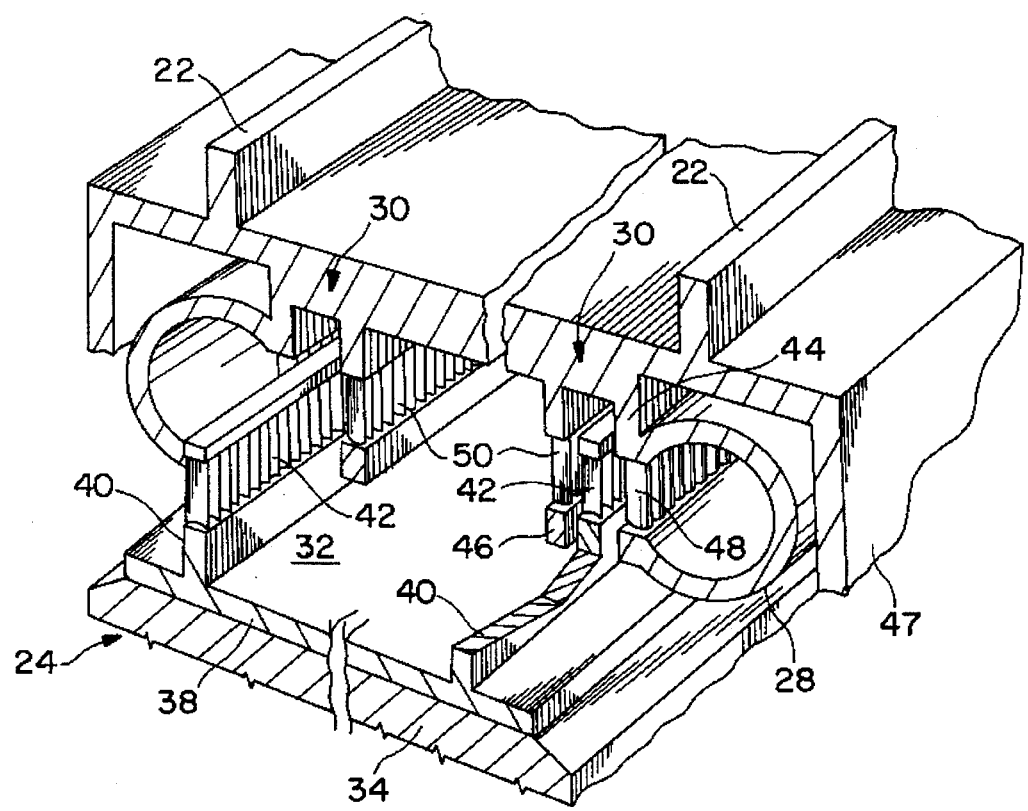
FIG. 2 is a perspective cross-sectional view of part of a mass transit vehicle of the type illustrated in FIG. 1 generally along line 2—2 in FIG. 1, certain parts being cut away for clarity.
Figure 3:
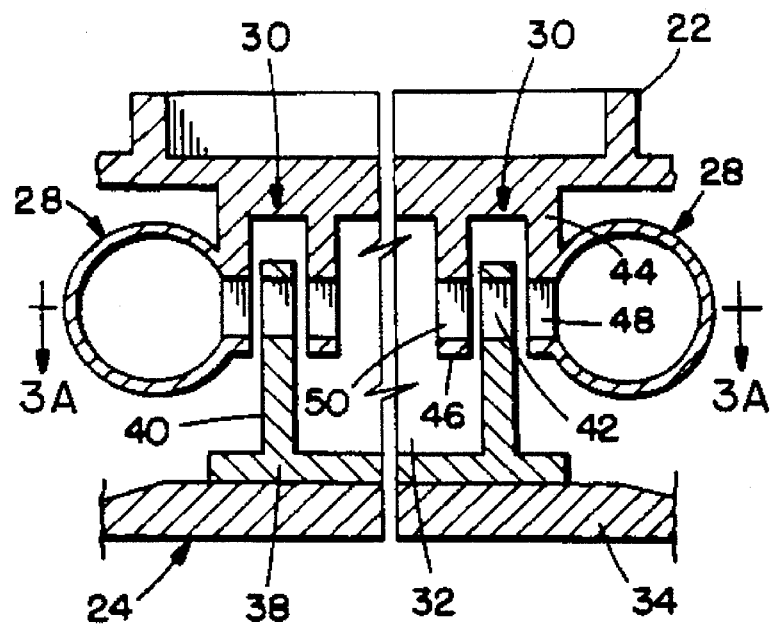
FIG. 3 is a cross section view also taken generally along line 2—2 in FIG. 1, certain parts also being cut away for clarity.
Figure 3A:
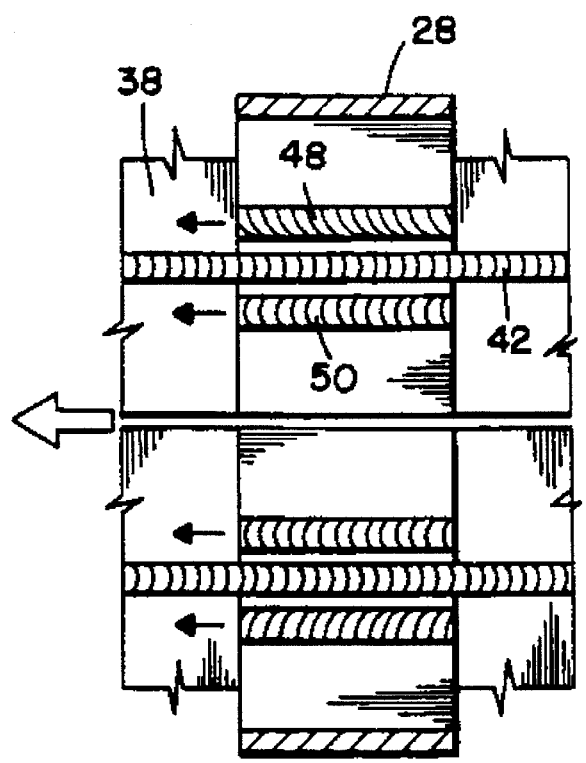
FIG. 3A is a simplified cross section view taken generally along line 3A—3A in FIG. 3 showing operative principles of the invention.

As seen in FIGS. 1–3, manifold 28 extends along each side of the vehicle 22 rearward of the gas producer and receives exhaust gases or a propulsive fluid stream from the gas producer 26. The fluid stream is directed to linear turbine assemblies 30 (FIG. 2) which likewise extend longitudinally along the side of the vehicle 22. The propulsive fluid stream flows through the linear turbine assemblies 30 in a manner to be described and enters a plenum 32 beneath the vehicle 22 which serves to support the vehicle on a cushion of turbine exhaust gas.

The pressure of the gascushion in plenum 32, which generates the total lift force, is controlled by a flap (not shown) at the aft end of the plenum 32 which regulates the gas discharge area. The forward end of the gascushion chamber is closed off.

Exhausting into the gascushion in plenum 32 requires exhausting against a back pressure, specifically the pressure needed to provide adequate levitation. This reduces the linear turbine drive power somewhat. However, as subsequent analysis (FIG. 5C) shows, that loss is not very significant.

Turning now to FIG. 2, each linear turbine assembly 30 is seen to include a stationary or ground-based component and a moving or vehicle-based component. The ground-based component of each linear turbine assembly 30 includes a footing 38 which is rigidly mounted on the base member 34 in any suitable fashion and a pair of upstanding longitudinally extending rail members 40. Each of the upstanding rail members 40 supports a continuing series of fixed stator blades or airfoils 42 which extend along the length of the track structure 24. The stator blades 42 are all substantially identically positioned on the rail member 40 such that their longitudinal axes are all parallel and are substantially upright or vertically disposed.

The vehicle based component of each of the linear turbine assemblies 30 includes a longitudinally extending nozzle blade assembly 44 and a longitudinally extending turbine blade assembly 46 which are integral with an underside of the vehicle 22 and extend downwardly therefrom. The nozzle blade and turbine blade assemblies 44, 46 lie in substantially parallel planes and, as seen in FIG. 3, are parallel also to the planes of the rail members 40 which they straddle. That is, the nozzle blade and turbine blade assemblies 44, 46 are positioned on opposite sides of the rail member 40 and are substantially equally spaced from the rail member 40 on each side thereof.

Each nozzle blade assembly 44 supports a plurality of nozzle blades or airfoils 48 rigidly mounted to each nozzle blade assembly 44 on upright or substantially vertical axes which are generally parallel with the axes of the stator blades 42. In a like manner, a plurality of turbine blades or airfoils 50 are rigidly mounted to and integral with each turbine blade assembly 46 and have longitudinal axes which are substantially parallel to the longitudinal axes of the nozzle blades 48 and of the stator blades 42. The stator blades 42, the nozzle blades 48, and the turbine blades 50 are proximately, coextensively, and cooperatively positioned with respect to each other.

Figure 3B:
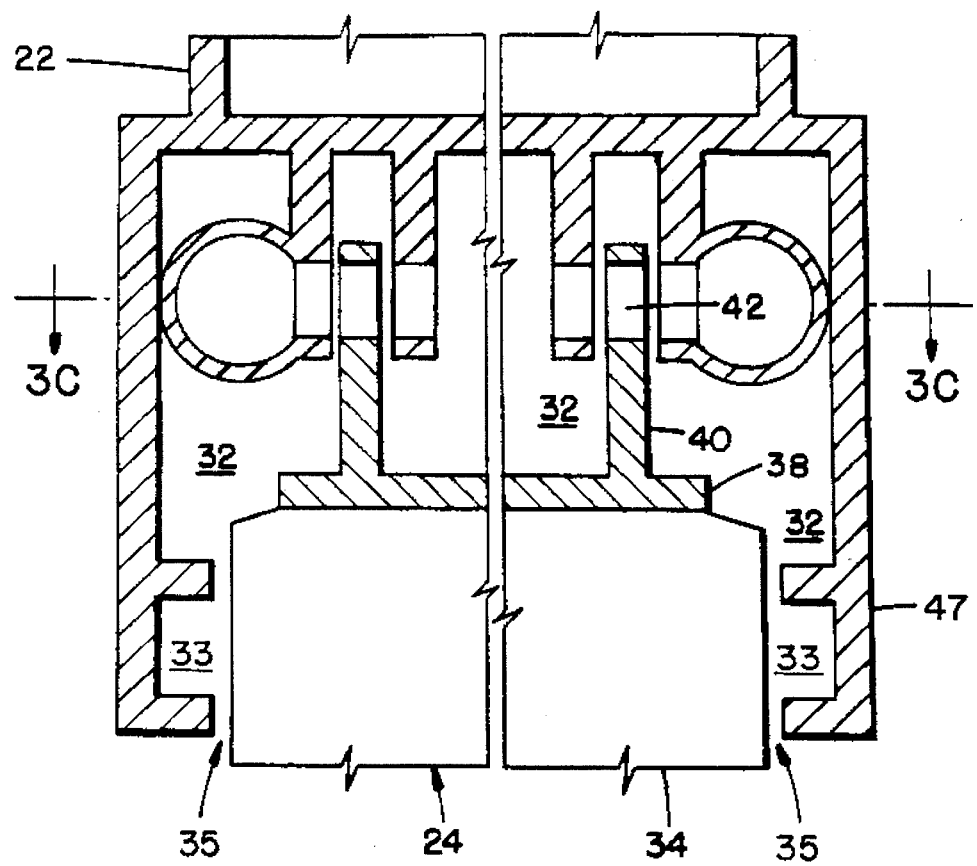
FIG. 3B is a cross section view taken generally along line 3B—3B in FIG. 1.

An outer housing 47 extends outwardly and downwardly from each side of the vehicle 22 and along substantially the entire length of vehicle 22. Each outer housing 47 serves to provide containment and mounting support for gas producer 26 and manifold 28, and to extend plenum 32 defining the gascushion forward and aft of the gas producer 26 and manifold 28 for support of vehicle 22 along its length. As shown in FIG. 3B, each outer housing 47 also defines associated lateral gas pockets 33 forward and aft of the gas producer 26 and manifold 28 for lateral guidance of vehicle 22 along track structure 24.

The minimum number of turbine stages is two. The first stage consists of the moving nozzle blades 48; the second stage is comprised of the fixed stator blades 42 and the moving turbine blades 50. The two-stage turbine is an appropriate choice for a high-speed ground transportation vehicle with a design speed on the order of 300 miles per hour. Additional turbine stages comprised of further sets of ground-based stator blades and vehicle-based turbine blades would be advantageous if the design speeds were lower or if the pressure of the gas provided by a jet engine gas producer were higher than pressure supplied by a fan engine gas producer.

Additional turbine stages may be advantageously utilized on certain sections of the track structure 24 where a higher thrust at a lower operating speed is desirable. Increasing the acceleration out of a terminal and climbing a mountain are examples of such instances where one or more additional stator vane rails could be installed on the track. Corresponding additional turbine blade sets would be provided on the vehicle 22.

Figure 7:
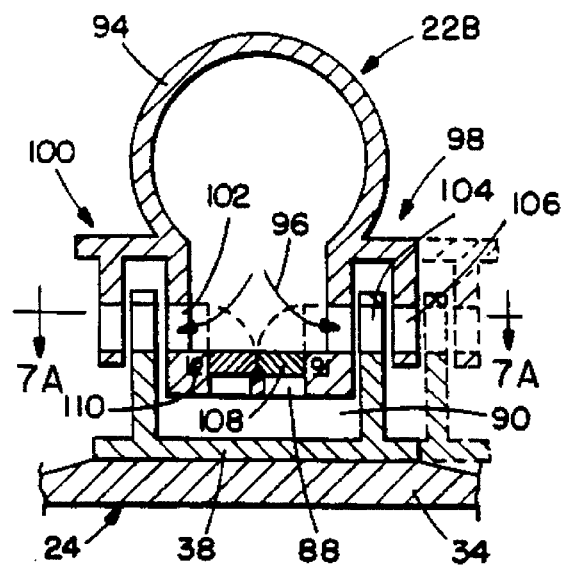
FIG. 7 is a detail cross section view, similar to FIGS. 3 and 6, depicting another embodiment of the invention.

One such embodiment of the present invention is shown in FIG. 7, where additional vehicle-mounted nozzle blade assemblies, fixed stator blade assemblies, and vehicle-mounted turbine blade assemblies are shown by dashed lines as being provided outboard of linear turbine assemblies 98, 100 (for simplicity, only one additional linear turbine assembly is shown for the embodiment of that Figure). Those skilled in the art will appreciate that, for the embodiment of FIGS. 1–3C, the additional turbine blade assemblies would be provided inboard of the linear turbine assemblies 30. Such persons would also understand that the lateral spacings of the ground-based and vehicle-mounted blade assemblies of the linear turbine assemblies would be selected such that single gas producer embodiments and multiple gas producer embodiments of the invention would be compatibly operable on track sections having only the minimum number of turbine stages as well as on those sections having additional stages as discussed above. On high-speed track sections, where no additional stator blades are installed, the additional turbine blade sets are inoperative.

FIG. 4 shows a cross section through the turbine blading of linear turbine assembly 30. In this instance, the first stage is comprised of the vehicle-based nozzle blades 48 in which the total head of the exhaust gas is converted into velocity. In other words, the first turbine stage operates with 100% reaction. The second turbine stage comprises the ground-based stator blades 42 and the vehicle-based turbine blades 50. The first stage provides the ground-based second stage stator blades 42 with an exhaust gas flow having a velocity which is the nozzle exhaust velocity minus the travelling speed of the vehicle 22 (for simplicity, transverse velocity components have been ignored). The stator blades 42 nearly reverse the flow and direct the gases into the vehicle-based turbine blades 50. Forces resulting from the change in flow direction in these turbine blades 50 provide an additional thrust to the vehicle 22 in the direction of the vehicle velocity vector, u.

Since the total head of the exhaust gas from the propulsive fluid stream from the gas producer 26 has already been converted into velocity in the nozzle blades 48, the second stage of linear turbine assembly 30 operates at constant pressure in accordance with the impulse principle. It is appropriate, then, to refer to the moving nozzle blades 48 as the "reaction stage" and to the combination of the fixed stator blades 42 and the moving turbine blades 50 as the "impulse stage."

The impulse design is preferred because of two attendant advantages. First, since the pressure is constant downstream of the first nozzle blade 48, there are virtually no leakage losses, and relatively large gaps between the moving vehicle 22 and the stationary track structure 24 can be accommodated. This increases the allowable alignment tolerances between the vehicle 22 and the guideway represented by the rail member 40. Secondly, an impulse turbine stage handles a higher gas enthalpy increment than a reaction stage and thereby limits the number of stages required to handle the total enthalpy increment. However, inasmuch as reaction turbines have a somewhat higher efficiency than impulse turbines, embodiments of the invention may incorporate an amount of reaction design into the impulse design. The favorable pressure gradient associated with reaction would improve the flow through the blade passages.

It will be appreciated that continued use of the linear turbine assemblies 30 and the attendant blowing action will keep the stator blades 42, nozzle blades 48, and turbine blades 50 clean and free of debris. Furthermore, mechanical stresses in the blades of a linear turbine are small compared to blade stresses in rotating machinery, where centrifugal forces are predominant. Thermal stresses in the moving components of the linear turbine are similar to those in rotary turbines, but much reduced in the stationary components which are subject only to short duration impingement of hot gases. It is envisioned that the ground-based blades would be preferably manufactured from stainless steel or equivalent material to provide corrosion resistance.

Performance Analysis

The thrust forces generated by means of the linear turbine assemblies 30 may be determined with the aid of velocity vector diagrams as shown in FIG. 4A. In the diagram the following notations are used:

w represents gas velocity vectors relative to the moving vehicle;

c represents velocity vectors relative to the ground; and u represents the vehicle speed vector.

The thrust force generated in the first, or reaction, stage is the equivalent of the thrust produced if the total propulsive fluid stream from the gas producer 26 were exhausted through one large nozzle in jet engine fashion. In the reaction stage, the propulsive fluid stream is expanded through moving nozzle blades 48 which are similar in design to the blades of conventional rotary turbines. A small proportion of the forward thrust is lost by deflecting the flow (for example, by about 25 degrees) into the lateral direction in order to direct it into the adjacent but fixed stator blades 42.

The net thrust ($F_r$) in the forward direction of the reaction stage is determined as $$F_r = \dot{m} c_{ur}$$

where $\dot{m}$ represents mass flow of the propulsive fluid stream through the reaction stage; $c_{ur}$ represents the component in vehicle movement direction of the nozzle exit velocity $C_o$; and $c_{ur} = F_r/\dot{m}$ is termed the effective reaction stage velocity.

The exhaust gas flow then enters the fixed stator blades 42 of the second, or impulse, stage as the vector $C_o$ and is changed in direction (such as by approximately 120 degrees) to emerge as $c_1$. Relative to the moving impulse stage turbine blades 50, $c_1$ becomes $w_1$. In the moving turbine blades 50, $w_1$ is redirected back (for example, by 120 degrees) to emerge as $w_2$ which is $c_2$ relative to the ground.

The thrust force ($F_i$) generated in the impulse stage is determined as $$F_i = \dot{m} c_{ui}$$

where $c_{ui}$ is the blade entry minus blade exit velocity difference projected into the travel vector direction and $c_{ui} = F_i/\dot{m}$ is termed the effective impulse stage velocity. The magnitudes of some of the velocity vectors and associated Mach numbers are presented in Table 1. The vehicle 22 is assumed to travel at 300 mph or 440 ft/sec.

TABLE 1

| | Velocity Magnitude of Vector Diagrams | | | | | | | |
|---|---|---|---|---|---|---|---|---|
| BPR | $W_o$ | $M_{wo}$ | $C_o$ | $M_{co}$ | $C_{ur}$ | $C_2$ | $M_{c2}$ | $C_{ui}$ | $C_{ur}$ plus $C_{ui}$ |
| 0.125 | 2656 | 1.31 | 2240 | 1.10 | 2085 | 1465 | 0.72 | 1815 | 5345 |
| 1.0 | 1990 | 1.15 | 1580 | 0.92 | 1460 | 860 | 0.50 | 2020 | 3480 |
| 2.0 | 1590 | 1.03 | 1180 | 0.76 | 1080 | 550 | 0.35 | 1250 | 2330 |

It should be noted that the exhaust velocities $w_o$ are supersonic. However, the exhaust velocities with respect to the stator, i.e. $c_o$, are generally subsonic. Therefore, no shock losses will be encountered. The case of BPR=0.125, where $M_{co}$=1.10, is an exception. This is the primary reason for favoring moderate bypass ratio engines.

Relevant engine cycle information is presented in Table 2 together with estimated data pertaining to the linear turbine drive. For the mass flow calculations, it is assumed that the total propulsive net thrust F=20,000 lb.

TABLE 2

| | Propulsive Characteristics | | | | |
|---|---|---|---|---|---|
| U = 440 ft/sec | BPR | ṁ$_{air}$ | ṁ$_{fuel}$ | ṁ$_{fuel}$/ṁ$_{air}$ | SFC |
| PURE FANJET | 0.125 | 261 | 4.82 | 0.01845 | 0.867 |
| | 1.0 | 380 | 3.97 | 0.01045 | 0.715 |
| | 2.0 | 515 | 3.47 | 0.00675 | 0.625 |
| LINEAR TURBINE | 0.125 | 120 | 2.22 | 0.01845 | 0.399 |
| | 1.0 | 185 | 1.93 | 0.01045 | 0.348 |
| | 2.0 | 276 | 1.86 | 0.00675 | 0.335 |

Figure 5A:
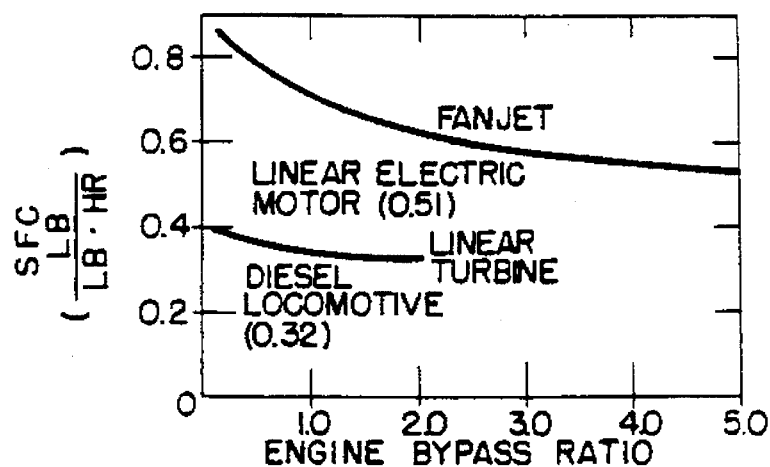
FIG. 5A is a graph providing a specific fuel consumption comparison between the present invention and other propulsion systems.
Figure 5B:
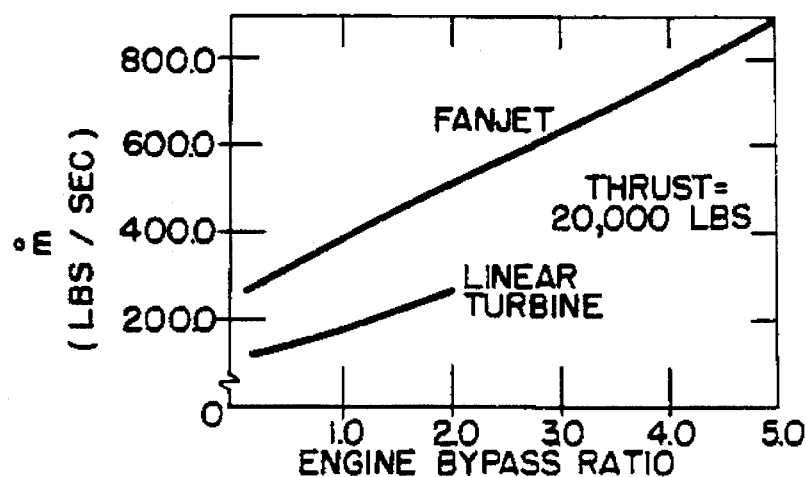
FIG. 5B is a graph presenting a comparison of engine air flow comparisons between linear turbine propulsion systems and pure fan jet engines, all producing a thrust of 20,000 lbs at a speed of 300 mph.

The advantages in terms of propulsion efficiency and system size of the linear turbine drive over standard aeronautical engines is shown in FIGS. 5A and 5B. Not only is its specific fuel consumption (SFC) much improved, the linear turbine drive also produces a given level of thrust in a small size unit.

It should be understood that the above values are representative, and that design optimization and accounting for viscous fluid losses may produce different values at lower engine bypass ratios, it would also be economical to add a second impulse stage to extract additional thrust.

FIG. 5A also indicates representative specific fuel consumption figures for Diesel engines and electric linear induction motors (LIM). The LIM's relatively high specific fuel consumption was derived by accounting for electric power losses in transmission, distribution and collection, power conditioning and the inherent efficiencies of the linear induction motor and the electric power generating station.

Figure 5C:
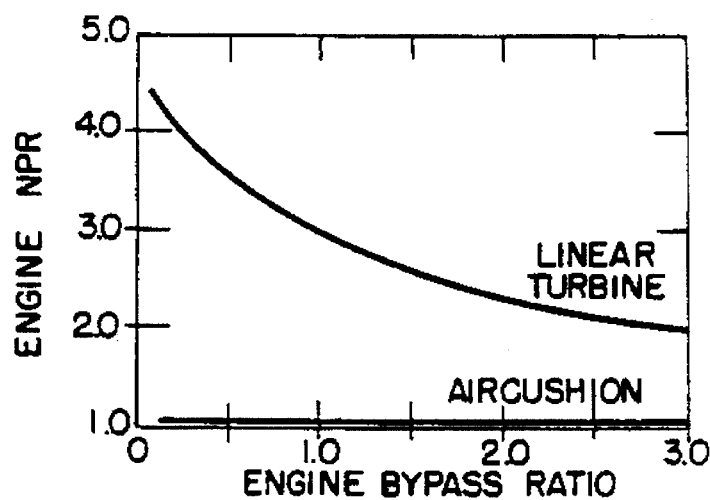
FIG. 5C is a graph presenting the magnitude of pressures available for linear turbine propulsion systems and required for an gascushion vehicle.

The exhaust gases from the gas producer 26 can also provide a gascushion underneath the vehicle 22 for the purpose of levitation. In that case the linear turbine assembly 30 will operate against a backpressure, specifically, the pressure needed to inflate the cushion. The loss in propulsive enthalpy increment available to the linear turbine assembly for generating vehicle motion will be reduced. This is a relatively small loss, however, since the cushion pressure is a small proportion of the total pressure supplied by the gas producer. Indeed, this is not really a loss in the overall power budget as there must always be energy allocated for levitation be it through electromagnetic forces or air pressure supplied by an auxiliary fan or by ram air, or for overcoming friction in wheel-on-rail systems. FIG. 5C correlates cushion pressures and total pressures as a function of engine bypass ratio.

Alternate Design Approaches

Figure 3C:
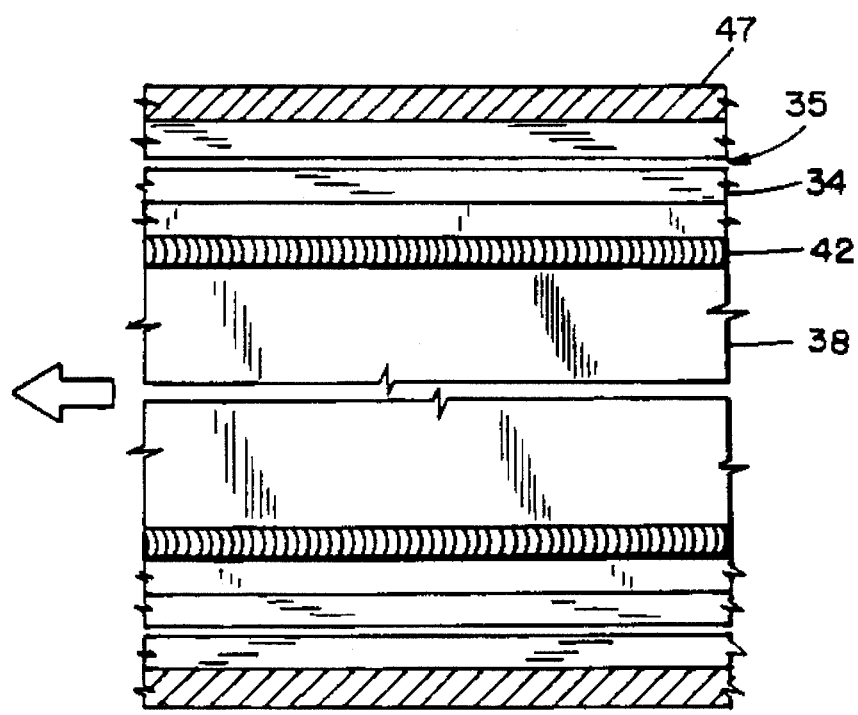
FIG. 3C is a cross section taken generally along line 3C—3C in FIG. 3B.

The design shown in FIGS. 2 and 3 through 3C is most suitable for a combination of linear turbine drives with gascushion levitation. Twin power systems, i.e. gas producers 26, mounted on either side of the vehicle 22 exhaust inwardly through manifolds 28 and the linear turbine assemblies 30 into plenum 32 beneath the vehicle to form the gascushion supporting the vehicle. FIG. 3B is a vehicle cross-section aft of the power systems which shows the gascushion within plenum 32 and associated lateral guidance gas pockets 33 and exhaust gaps 35. With this design there is no provision for redirecting the propulsive fluid stream so as to achieve thrust reversal for purposes of braking and backup. Such provisions can be incorporated, however, by adapting thrust reversal features embodied in the following configurations.

Figure 6:
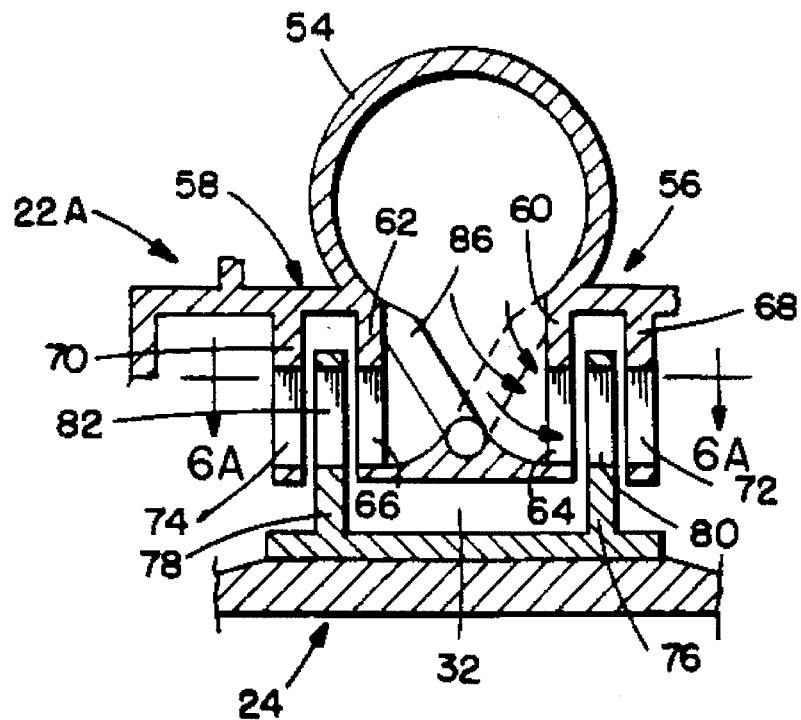
FIG. 6 is a cross section view, similar to FIG. 3, illustrating another embodiment of the invention, certain parts being cut away for clarity.
Figure 6A:
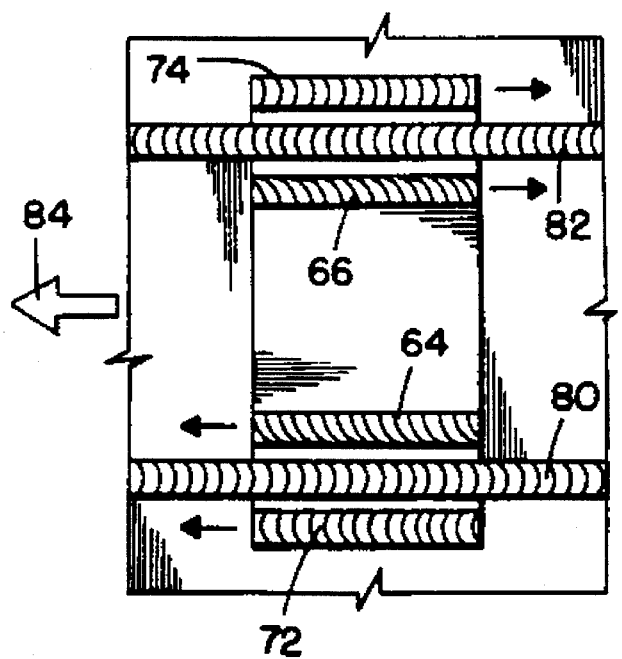
FIG. 6A is a simplified cross section view, similar to FIG. 3A, taken along line 6A—6A in FIG. 6 showing operative principles of the embodiment of FIG. 6.

A design for a linear turbine drive with a single gas producer (not shown) with braking or reverse thrust capability is illustrated in FIGS. 6 and 6A. The single gas producer will be understood to be mounted centrally within vehicle 22A forward of the plane of FIG. 6, and exhaust toward the rear of vehicle 22A into manifold 54.

As in the instance of the embodiment considered in FIG. 3, the propulsive fluid stream in the embodiment shown in FIG. 6 is collected in a plenum 32 beneath vehicle 22A where it can be used for levitation. In this embodiment, provision is also made for thrust reversal. A single manifold 54 is used to direct the flow of the propulsive fluid stream to a pair of linear turbine assemblies 56, 58 which are generally similar to the linear turbine assemblies 30 of the earlier described embodiment of FIGS. 1–3C.

It will be appreciated, however, that, because the embodiment shown in FIG. 6 incorporates a centrally mounted gas producer and manifold 54 which directs the propulsive fluid stream outwardly (as opposed to the inwardly-directed propulsive fluid streams from the dual, outboard gas producers 26 of the embodiment of FIGS. 1–3C), the positions of the nozzle blade assemblies and the turbine blade assemblies are reversed from the embodiment of FIGS. 1–3C.

That is, in the embodiment of FIG. 6, moving nozzle blade assemblies 60, 62 integral with the vehicle 22A are located inboard from the fixed rail members 76, 78, respectively, and support a plurality of rigidly mounted nozzle blades 64, 66, respectively. Correspondingly, moving turbine blade assemblies 68, 70 integral with the vehicle 22A are located outboard from the fixed rail members 76, 78, respectively, and support a plurality of rigidly mounted turbine blades 72, 74, respectively. Fixed, upstanding rail members 76, 78 each support a plurality of stator blades 80, 82, respectively.

However, and different from the embodiment of FIGS. 1–3C, the nozzle blades 64 are positioned and oriented to direct flow of the propulsive fluid stream in a rearward direction to propel the vehicle 22A in a forward direction, that is, in the direction of arrow 84 (FIG. 6A). Conversely, the nozzle blades 66 are positioned to direct flow of the propulsive fluid stream in a forward direction to propel the vehicle 22A in a rearward direction, that is, in a direction opposite that of the arrow 84. A diverter valve 86 positioned intermediate the manifold 54 and each of the linear turbine assemblies 56, 58 is selectively movable to direct the propulsive fluid stream either through linear turbine assembly 56 for forward propulsion or through linear turbine assembly 58 for rearward propulsion. In FIG. 6, the diverter valve 86 is illustrated by solid lines so as to close flow of the propulsive fluid stream through assembly 58 and open it to linear turbine assembly 56. An opposite position is indicated by dashed lines.

With this construction, the use of the same track structure 24 is allowed for vehicles 22A to move in either a forward or a rearward direction. Additionally, switching flow of the propulsive fluid stream from one side to the other produces strong braking forces. When the vehicle is stopped, the valve 86 is desirably positioned in a centered, or neutral, position allowing the propulsive fluid stream to flow through both of the linear turbine assemblies 56, 58, simultaneously. This cancels the forward and rearward propulsion forces and keeps the vehicle at a standstill while permitting the gas producer to operate at maximum power in preparation for a high acceleration departure.

In the embodiment of FIGS. 6 and 6A, the propulsive fluid stream is directed by the valve 86 to one or the other of linear turbine assemblies 56, 58. This condition necessarily produces a side force on the vehicle 22A in the direction opposite to the mean direction of the propulsive fluid stream flow, which must be countered by an opposing force from a the lateral guidance system of vehicle 22A. Where the vehicle 22A is supported exclusively by a gascushion, the pressure in the lateral gas pockets (as for example gas pockets 33 of the embodiment shown in FIG. 3B) can be selectively increased by appropriate pressure regulating means to generate the necessary countering opposing force. For instance, the side force from the diversion of the propulsive fluid stream will of itself create a countering force, since the side force will tend to move vehicle 22A to one side or the other and thus narrow the exhaust gap 35 on the side of vehicle 22A opposite to the linear turbine assembly through which the propulsive fluid stream is directed. The narrowed exhaust gap will increase the pressure in its associated lateral gas pocket 33, producing a side force tending to offset the side forces produced by the diverted propulsive fluid stream.

Figure 7A:
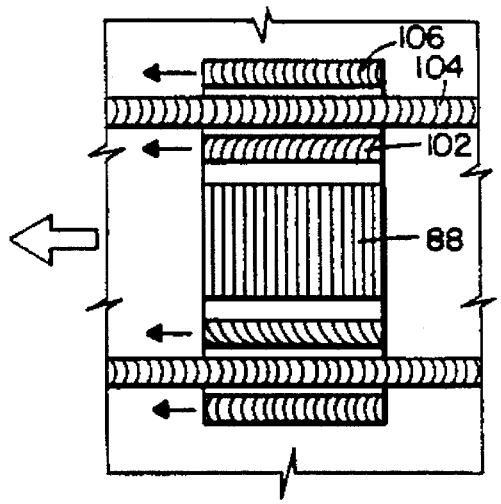
FIG. 7A is a simplified cross section view taken generally along lines 7A—7A in FIG. 7 showing operative principles of the embodiment of FIG. 7.
Figure 7B:
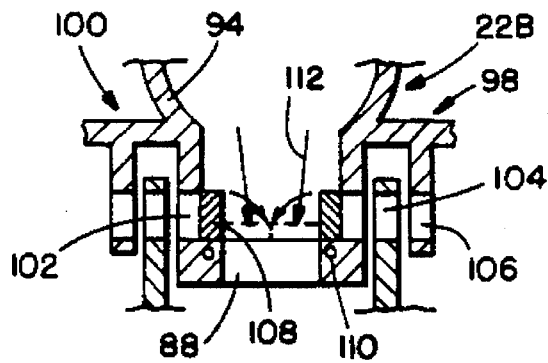
FIG. 7B is a further detail cross section view illustrating another position of operating components in FIG. 7.

Another embodiment of the invention utilizing a single gas producer is illustrated in FIGS. 7, 7A, and 7B. This embodiment provides balanced side forces by splitting the flow of the propulsive fluid stream left and right into the linear turbine assemblies 98, 100. Reversing forces are generated by directing the propulsive fluid stream through bottom reverse flow nozzles 88. Those skilled in the art will understand that a two-stage reverser design is feasible incorporating elements of embodiments of the invention discussed above. However, a one-stage thrust reversing design which does not require additional stators and second-stage turbine blades, represents a preferred, efficient high speed braking system, especially when one considers the fact that the aerodynamic drag and the engine ram drag add to the deceleration. Low speed braking may also be achieved conventionally by means of mechanical brakes, electrical eddy current brakes, or the like. Such alternate braking methods would be preferably included for safety reasons in vehicles incorporating the present invention.

As shown in FIG. 7, the reverser exhaust flow is channelled forward in a trough 90 below the modified vehicle 22B. The trough 90 also may serve as a plenum for supporting the vehicle 22B on a gascushion as mentioned with the earlier described embodiments.

It will be appreciated that the arrangement of the nozzle blades 102, stator blades 104, and turbine blades 106 in the embodiment of FIGS. 7, 7A, and 7B are substantially similar to those corresponding elements described for the previous embodiment illustrated in FIGS. 6 and 6A. Thus, when operating in the normal fashion, the propulsive fluid stream from a single centrally disposed gas producer (not shown) flows via a manifold 94 in the direction of arrows 96 through the blades of linear turbine assemblies 98, 100, respectively.

More specifically, flow progresses through nozzle blades 102, then through stator blades 104, then through turbine blades 106.

Pivotally mounted to the base of the vehicle 22B are a pair of closure doors 108 which are hinged as at pivot 110 for movement between solid line positions and dashed line positions. The reverse flow nozzles 88 lie in a plane which is generally transverse of the planes of the first and second linear turbine assemblies 98, 100. When the closure doors are in the solid line position, they overlie and close off flow through the reverse flow nozzles 88 and assure flow in the direction indicated by the arrows 96. However, when the closure doors 108 are moved to the dashed line positions of FIG. 7, that is, the same as the solid line position of FIG. 7B, the closure doors 108 overlie the linear turbine assemblies 98, 100 thereby closing off flow through nozzle blades 102, stator blades 104, and turbine blades 106, and directing the flow of the propulsive fluid stream, as is indicated by arrows 112, through the reverse flow nozzles 88.

Figure 8:
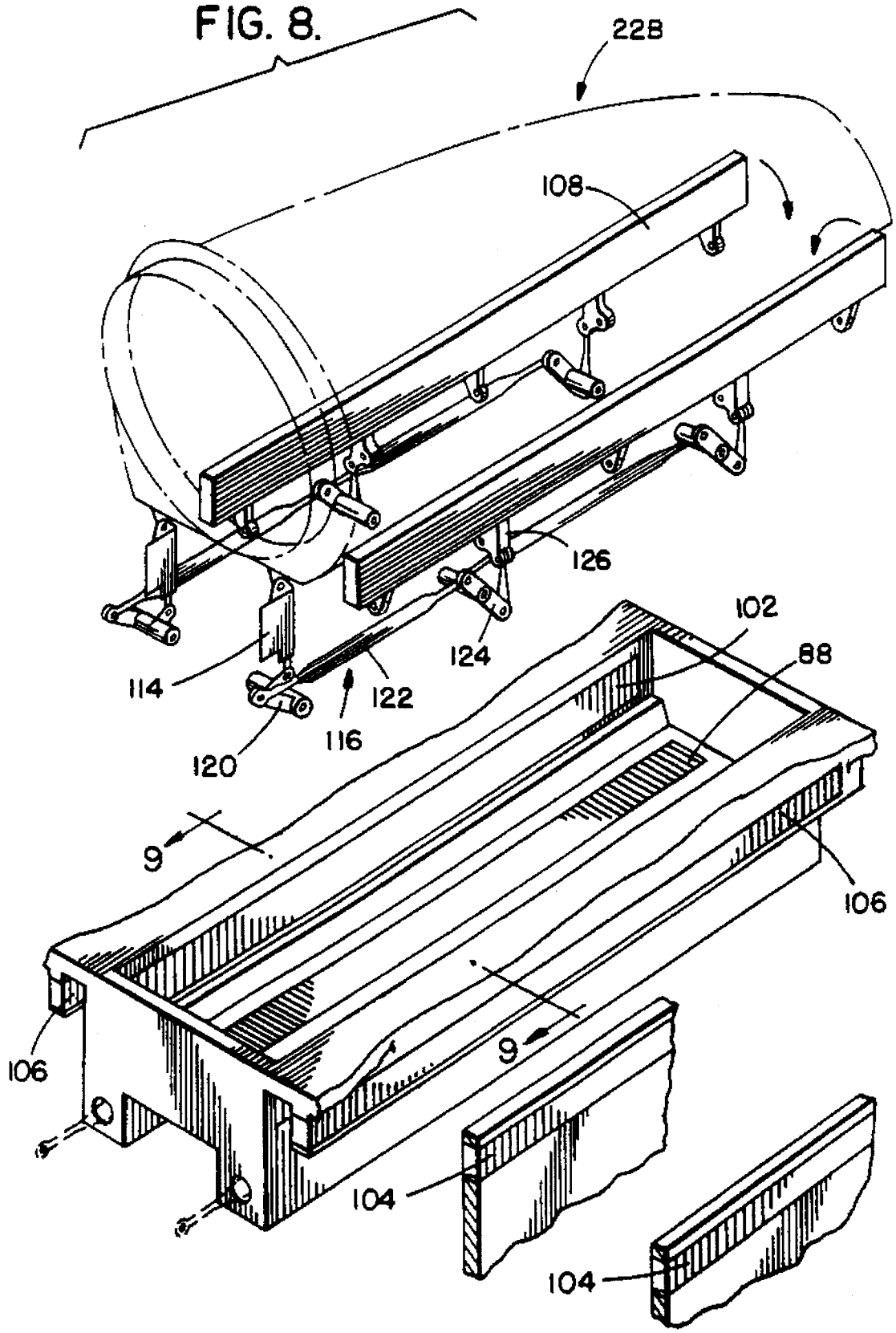
FIG. 8 is an exploded perspective view of certain components of the embodiment illustrated in FIGS. 7, 7A, and 7B.

To effect operation of each of the closure doors 108, a suitable actuator 114 is employed which operates via a linkage 116. As diagrammatically illustrated in FIGS. 8, 9, and 10, one end of an actuator 114 for each closure door 108 is pivotally mounted on the vehicle 22B and an end of its actuating rod 118 is pivotally attached to a bell crank 120 which, in turn, connects through an extended link 122 and a pivot link 124 to another bell crank 126 which is attached to the closure door 108. Two or more such linkages may be connected in series for the length of the closure door 108, if necessary.

Although the invention has heretofore been described in terms of a vehicle supported on a gascushion, it will be understood that the vehicle gascushion support may be supplemented or substituted for by magnetic levitation (MAGLEV) or by conventional wheel-on-rail apparatus.

MAGLEV forces, in particular, can be advantageously utilized in place of the gascushion support, or to supplement it, to provide superior tracking control over embodiments utilizing only gascushion support. High speed ground vehicles must provide acceptable ride qualities for passenger comfort, which requires control of the airgaps between the vehicle and the track structure and of the lateral and vertical acceleration forces which occur during vehicle movement. Airgap control is also required to insure proper alignment of the components of the linear turbine assemblies which propel the vehicle.

Magnetic levitation, being an electrical system, has a high response rate to control system inputs and is therefore better suited for performing the tracking control task than is the slower, mechanical gascushion system. For that reason, a combination of gascushion and MAGLEV support and tracking guidance is advantageous. In such a hybrid system, the gascushion is designed to provide primary vehicle support, and the more easily controlled MAGLEV system is employed to control vertical and lateral tracking.

Figure 11:
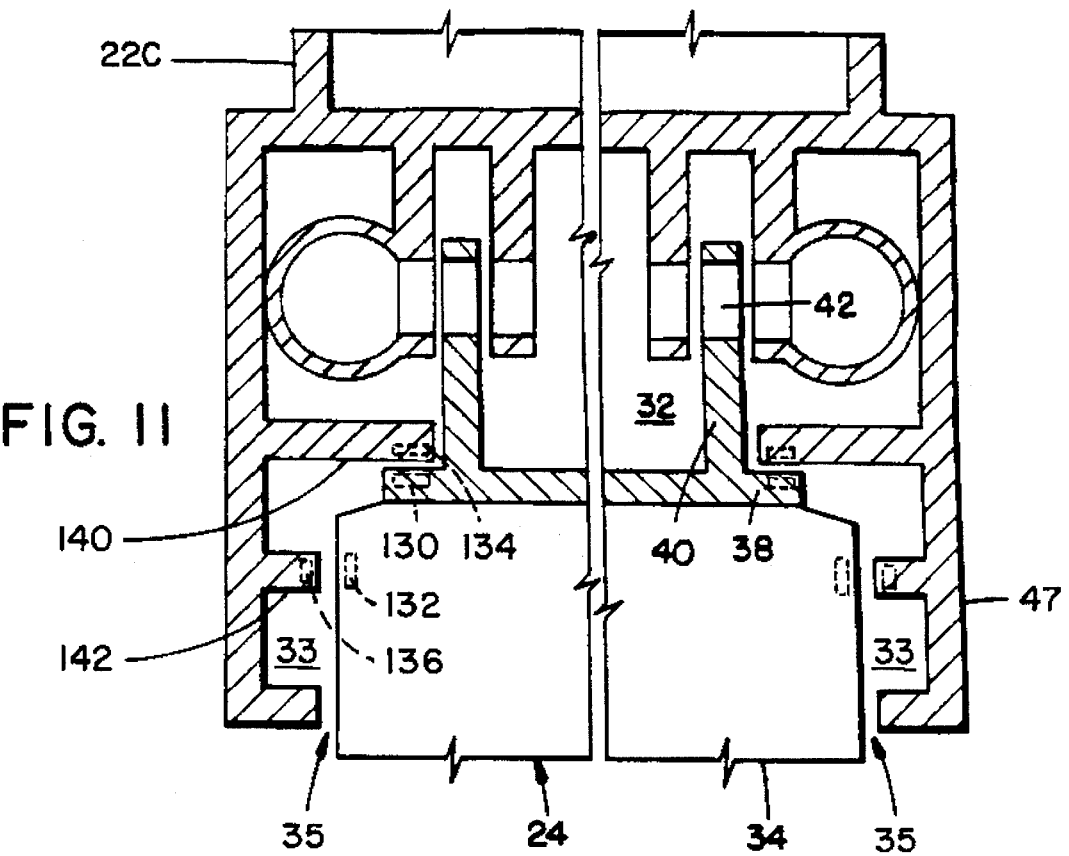
FIG. 11 is a cross-sectional view corresponding to FIG. 3B for a mass transportation system vehicle of the present invention having gascushion levitation and magnetic levitation.

A number of magnetic levitation systems and concepts are known in the art, and are compatible for incorporation with the linear turbine propulsion system of the present invention. One embodiment of the present invention incorporating MAGLEV support and tracking control is shown in FIG. 11.

In that embodiment, a plurality of flat, closed-loop, track coils 130, 132 are provided in the base of footing 38 outboard of rail members 40 and in the sides of base member 34, respectively, along the length of track structure 24. A plurality of cooperating vehicle coils 134, 136 are provided in inwardly extending support members 140 and upper gas pocket member 142, respectively, of vehicle 22C along its length for suspension and tracking.

Cooperating track coils 130 and vehicle coils 134 interact as described below to provide levitation forces to control vertical tracking of vehicle 22C as it moves along track structure 24. Cooperating track coils 132 and vehicle coils 136 interact as described below to control lateral tracking of vehicle 22C as it moves along track structure 24.

The vehicle coils 134, 136 are formed of superconducting material and are powered by a power source (not shown) on vehicle 22C such as a generator or batteries. Track coils 130, 132 are not superconductive and are not themselves powered.

Since the vehicle coils 134, 136 move with vehicle 22C as it is propelled along track structure 24, the magnetic fields generated by superconducting vehicle coils 134, 136 induce electric currents in the ground-based track coils 130, 132 which in turn produce magnetic fields which oppose the magnetic fields of the moving vehicle coils 134, 136.

The strength of the repulsive forces from these opposing magnetic fields is inversely proportional to the distance between the opposing coils (i.e., the airgap distance) and thus the repulsive forces operate to keep vehicle 22C laterally centered over the rail members 40 and track structure 24 and suspended a selected clearance distance above the upper surfaces of rail members 40.

Active tracking guidance is provided by continuously measuring the airgap separation between the track coils 130, 132 and the vehicle coils 134, 136 and also the vertical and lateral accelerations of vehicle 22C, by conventional means known to those skilled in the art, and by selectively controlling the strengths of the magnetic fields produced by the superconducting vehicle coils 134, 136 in response to such measurements to maintain or alter the airgap and clearance distances and thereby control lateral and vertical excursions of vehicle 22C from its designed position relative to the rail members 40 and track structure 24. The magnetic forces thus insure that vehicle 22C is smoothly transported along the track structure 24 without passenger discomfort or damage to cargo, and compensate for such events as wind gusts, centrifugal forces encountered in traveling along a curving track, and track misalignments.

In the embodiments described above, which combine MAGLEV components with the linear turbine drive, only the support and guidance functions of MAGLEV are utilized. The linear electric motor features of MAGLEV, which provide propulsion and which are generally considered to be an integral part of a MAGLEV system, are not utilized.

Wheel-on-rail has been a standard suspension and guidance technique used in the railroad and other industries since the inception of that technology some 150 years ago. In a wheel-on-rail system, a wheel rim rides on the upper surface of a rail for vehicle support, while a wheel flange extending beside and below the rail upper surface controls lateral motion of the vehicle relative to the rail and thus provides vehicle guidance.

Wheel-on-rail support is in general highly compatible with a vehicle incorporating the linear turbine propulsion system of the present invention, at least at low and moderate vehicle speeds (as for example up to about 100 mph). However, at the high operating speeds contemplated for typical operation of vehicles propelled by the present invention (as for example approximately 250–300 mph), the rail surfaces upon which the wheel rides must be of extraordinary smoothness in order to provide acceptable ride qualities for passenger comfort.

Therefore, wheel-on-rail is preferably incorporated in vehicles driven by linear turbine propulsion systems of the present invention only to provide auxiliary or emergency support and guidance in situations where the gas generator is not operating or no longer capable of providing sufficient gascushion support. Such circumstances would occur, for example, inside terminal areas or upon engine failure. In normal operation, the gascushion would elevate the vehicle by a slight distance sufficient to disengage the wheel from the rail and provide a smooth ride.

Figure 12:
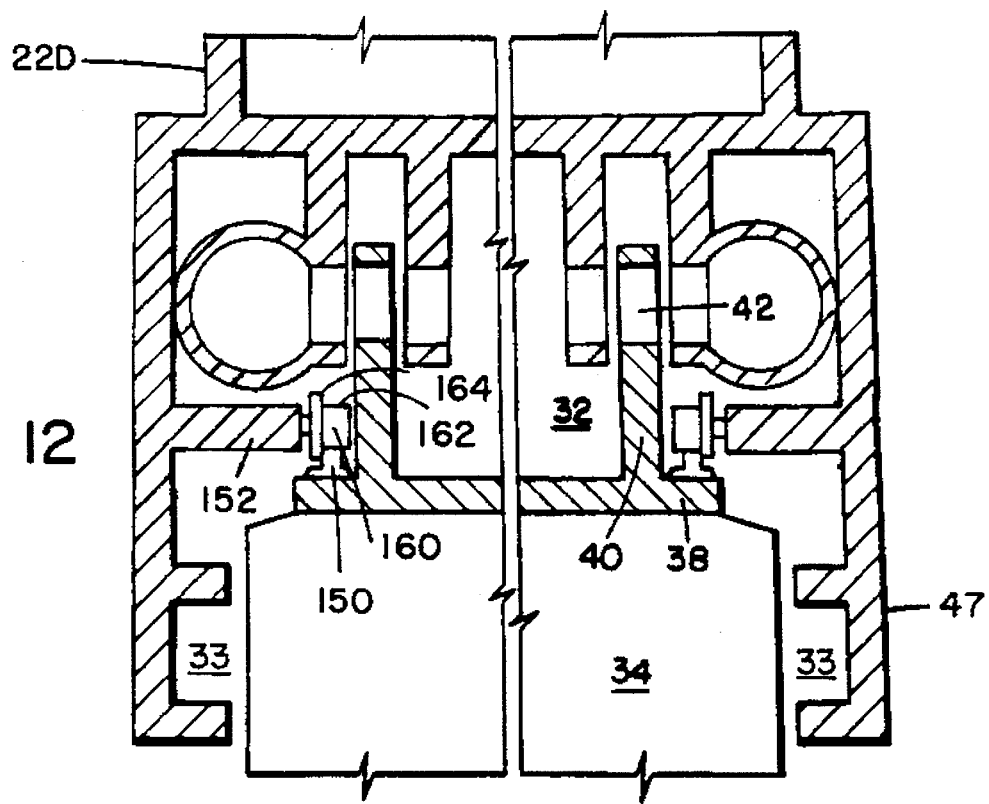
FIG. 12 is a cross-sectional view corresponding to FIG. 3B for a mass transportation system vehicle of the present invention having gascushion levitation and wheel-on-rail support; and, FIG. 13 is a cross-sectional view corresponding to FIG. 3B of an embodiment of the invention in which the linear turbine assemblies are oriented horizontally and incorporating magnetic levitation means for support of the vehicle.

One embodiment of wheel-on-rail support in combination with the linear turbine of the present invention is shown in FIG. 12. There, it is seen that rails 150 are provided on the foot of base member 38 outboard of rail members 40. A plurality of wheels 160 are rotatably mounted to the inboard ends of support members 152, which extend inwardly from the outer housing 47 of vehicle 22D.

Each wheel 160 has a rim surface 162 and a flange 164, and is positioned proximate to an associated rail 150 such that, in the absence of gascushion support, rim surface 162 engages the top of rail 150 for vertical support and tracking of vehicle 22D and flange 164 engages the outer side of rail 150 for lateral tracking and guidance of vehicle 22D.

Flange 164 in alternative embodiments could engage the inner side of rail 150, or wheel 160 could be provided with inner and outer flanges to straddle rail 150 and engage both the inner and outer sides of rail 150 for lateral tracking guidance. In normal operation, however, the propulsive fluid stream exhausting into plenum 32 provides sufficient support forces so that wheels 160 are elevated a slight distance above rails 150 and are disengaged therefrom to provide a smoother ride quality.

The foregoing discussion has presented the invention in a number of embodiments in which the nozzle blades, stator blades, and turbine blades have been oriented vertically. Although this is a preferred orientation, it will be understood by those skilled in the art that in still other embodiments the blades and linear turbine assemblies may be disposed horizontally with their axes extending laterally in a direction transverse to the longitudinal axis of the vehicle and to the track structure. One illustrative embodiment of the invention exemplifying such orientations is shown in FIG. 13.

Figure 13:
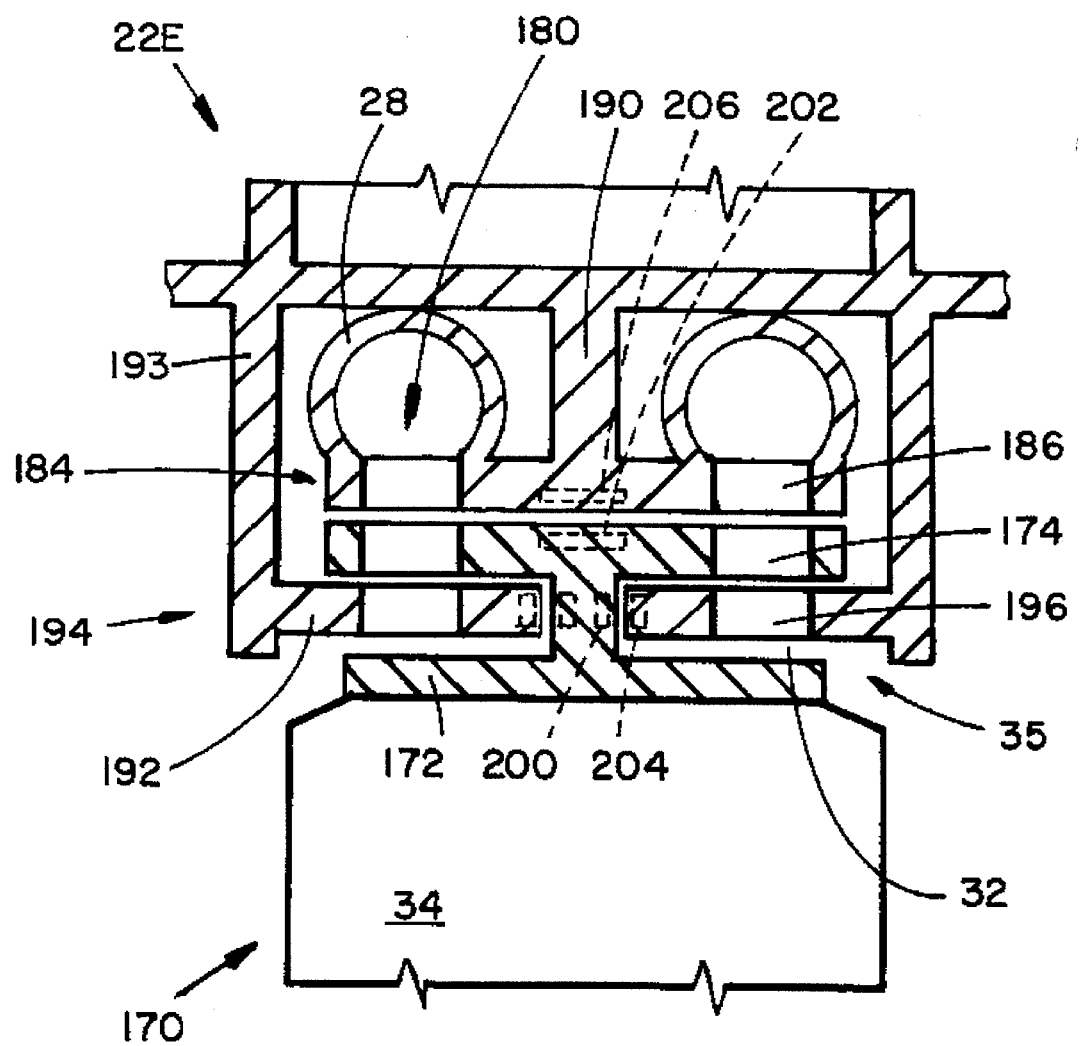

As seen in FIG. 13, vehicle 22E moves along a longitudinally-extending supporting and guiding track structure 170 which includes base member 34, as in previous embodiments of the invention, and an upstanding I-shaped rail member 172. Unlike the previous embodiments, rail member 172 includes a plurality of horizontally-oriented fixed stator blades 174 mounted in laterally spaced arrays within the cap portion of I-shaped rail member 172 and extending along the length of track structure 170. The stator blades 174 are generally identical to the stator blades of the previous embodiments, except for their horizontal orientation.

Vehicle 22E includes two manifolds 28 which each receive a propulsive fluid stream of exhaust gases from twin gas producers (not shown) and deliver the propulsive fluid streams to respective linear turbine assemblies 180 which are mounted to the undersurface of vehicle 22E.

Laterally spaced nozzle blade assemblies 184 are provided in the outboard segments of the top, or cap, portion of an inverted, T-shaped nozzle blade support member 190 which extends downwardly from the undersurface of vehicle 22E along the center of that vehicle. Each nozzle blade assembly 184 extends along the length of vehicle 22E and includes a plurality of rigidly mounted, horizontally oriented nozzle blades 186. The nozzle blades 186 are generally identical to the nozzle blades of the previous embodiments except for their horizontal orientation.

Laterally spaced turbine blade assemblies 194 are provided in turbine blade support members 192 which extend horizontally and inwardly from the interior walls of outer housing 193 toward the upstanding central rib of rail member 172. Each turbine blade assembly 194 extends along the length of vehicle 22E and includes a plurality of rigidly mounted, horizontally oriented turbine blades 196 which are generally identical to the turbine blades of the preceding embodiments except for their horizontal orientation.

The nozzle and turbine blade assemblies 184, 194 straddle the fixed stator blades 174 as their counterpart elements of the previous embodiments, but in a vertical direction. The nozzle, stator, and turbine blades 186, 174, and 196 respectively are proximately, coextensively, and cooperatively positioned as in the previous embodiments, but in a vertical direction.

Vehicle 22E is also seen to include MAGLEV components for vertical tracking and guiding. A plurality of track coils 200, 202 are provided in the cap and vertical rib segments, respectively, of rail member 172, and a plurality of cooperating superconducting vehicle coils 204, 206 are provided in the central region of nozzle blade support member 190 and in the inner ends of turbine blade support members 192 proximate the track coils 200, 202 respectively. The track and vehicle coils 200, 202, 204, and 206 are identical to the track and vehicle coils described for the embodiment of FIG. 11 above.

In operation, the propulsive fluid stream from each gas producer is directed by manifold 28 downwardly successively through the nozzle, stator, and turbine blades 186, 174, 196, respectively to generate propulsive forces for moving vehicle 22E in the manner described above for other embodiments of the present invention. The propulsive fluid stream exits each of the turbine blade assemblies 194 in a downward direction into plenum 32 formed beneath the vehicle 22E by the outer housing 193, the turbine blade support member 192, and the rail member 172. The exited propulsive fluid stream thus forms a gascushion, as in the previous embodiments, which can provide some or all of the support forces required to position vehicle 22E on the track structure 170. The propulsive fluid stream is vented, in the embodiment of FIG. 13, in outboard directions through exhaust gaps 35. The track and vehicle coils 200, 202, 204, and 206 cooperate as has been previously described to provide vertical and lateral tracking and guidance of vehicle 22E along track structure 170.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Propulsion apparatus for a longitudinally guided and laterally restrained vehicle, comprising:

gas producer means mounted on said vehicle for discharging a propulsive fluid stream;

longitudinally extending linear turbine means for receiving said propulsive fluid stream from said gas producer means and for directing said propulsive fluid stream so as to propel said vehicle; and, an outer housing extending outwardly and downwardly from sides of said vehicle and extending substantially along an entire length of said vehicle, said outer housing defining a plenum beneath said vehicle for receiving said propulsive fluid stream from said linear turbine means, said plenum defining a gascushion of said received propulsive fluid stream for support of said vehicle substantially along said entire length.

2. Propulsion apparatus as set forth in claim 1 wherein said gas producer means comprises:

a gas turbine engine; and manifold means for delivering said propulsive fluid stream from said gas turbine engine to said linear turbine means.

3. Propulsion apparatus as set forth in claim 2 wherein said linear turbine means comprises first and second parallel, spaced apart, linear turbine assemblies, each receiving a respective part of said propulsive fluid stream from said manifold means and each discharging said respective part of said propulsive fluid stream in an aft direction to thereby propel said vehicle in a forward direction.

4. Propulsion apparatus as set forth in claim 2 wherein said linear turbine means comprises first and second parallel, spaced apart, linear turbine assemblies, said first linear turbine assembly being adapted to receive said propulsive fluid stream from said manifold means and to discharge said propulsive fluid stream in an aft direction to thereby propel said vehicle in a forward direction, said second linear turbine assembly being adapted to receive said propulsive fluid stream from said manifold means and to discharge said propulsive fluid stream in a forward direction to thereby propel said vehicle in a rearward direction.

5. Propulsion apparatus as set forth in claim 2 wherein said linear turbine means comprises:

a plurality of nozzle blades rigidly mounted on said vehicle, each nozzle blade having a longitudinal axis which is transverse of said propulsive fluid stream from said manifold means, said longitudinal axes of said nozzle blades all being substantially parallel to one another;

a plurality of turbine blades rigidly mounted on said vehicle having longitudinal axes which are substantially parallel to said longitudinal axes of said nozzle blades, all of said turbine blades being substantially equally spaced from said nozzle blades; and, a plurality of ground-based stator blades, said stator blades having longitudinal axes which are substantially parallel to said longitudinal axes of said nozzle blades and of said turbine blades, said stator blades being positioned intermediate and substantially equally spaced from said turbine blades and said nozzle blades.

6. Propulsion apparatus as set forth in claim 2 wherein said linear turbine means comprises:

first stage airfoil means; and, second stage airfoil means spaced from and generally parallel with said first stage airfoil means, said first stage airfoil means being positioned for intercepting said propulsive fluid stream from said manifold means and for reversing its flow direction, said second stage airfoil means being positioned for receiving said propulsive fluid stream from said first stage airfoil means and for discharging said propulsive fluid stream in an aft direction to thereby propel said vehicle in a forward direction.

7. Propulsion apparatus as set forth in claim 1 wherein said linear turbine means comprises:

a nozzle blade assembly extending from said vehicle longitudinally along a length of said vehicle and defining a direction of movement of said vehicle;

a plurality of nozzle blades integral with said nozzle blade assembly and rigidly mounted thereto, each of said nozzle blades having a longitudinal axis which is transverse of said direction of movement of said vehicle, said longitudinal axes of said nozzle blades all being substantially parallel to one another;

a turbine blade assembly extending from said vehicle longitudinally along said length of said vehicle generally parallel to said nozzle blade assembly;

a plurality of turbine blades integral with said turbine blade assembly and rigidly mounted thereto, each of said turbine blades having a longitudinal axis which is substantially parallel to said longitudinal axes of said nozzle blades, all of said turbine blades being substantially equally spaced from said nozzle blades;

an upstanding longitudinally extending rail member; and, a plurality of stator blades integral with said upstanding rail member and rigidly mounted thereto, each of said stator blades having a longitudinal axis which is substantially parallel to said longitudinal axes of said nozzle blades and of said turbine blades, said stator blades being positioned intermediate and generally equally spaced from said turbine blades and said nozzle blades.

8. Propulsion apparatus as set forth in claim 2 wherein said gas turbine engine has a bypass ratio in the range of approximately 1.0 to 2.0.

9. Propulsion apparatus for a longitudinally guided and laterally restrained vehicle, comprising:

gas producer means on said vehicle for discharging a propulsive fluid stream;

first and second parallel longitudinally extending linear turbine means, each of said first and second linear turbine means receiving a respective part of said propulsive fluid stream from said gas producer means and directing said respective part of said propulsive fluid stream so as to propel said vehicle in a forward direction; and, an outer housing extending outwardly and downwardly from sides of said vehicle and extending substantially along an entire length of said vehicle, said outer housing defining a plenum beneath said vehicle for receiving said respective parts of said propulsive fluid stream from said first and second linear turbine means, said plenum defining a gascushion of said respective parts of said propulsive fluid stream for support of said vehicle substantially along said entire length.

10. Propulsion apparatus as set forth in claim 9 wherein said gas producer means comprises:

a gas turbine engine; and, manifold means for delivering said propulsive fluid stream from said gas turbine engine to said first and second linear turbine means.

11. Propulsion apparatus as set forth in claim 10 wherein each said linear turbine means comprises:

a plurality of nozzle blades rigidly mounted on said vehicle, each of said nozzle blades having a longitudinal axis which is transverse of said propulsive fluid stream from said gas turbine engine, the longitudinal axes of said nozzle blades all being substantially parallel to one another;

a plurality of turbine blades rigidly mounted on said vehicle having longitudinal axes which are substantially parallel to said longitudinal axes of said nozzle blades, all of said turbine blades being substantially equally spaced from nozzle blades; and, a plurality of ground-based stator blades, said stator vanes having longitudinal axes which are substantially parallel to said longitudinal axes of said nozzle blades and of said turbine blades, said stator vanes being positioned intermediate and substantially equally spaced from said turbine blades and said nozzle blades.

12. Propulsion apparatus as set forth in claim 10 wherein each said linear turbine means comprises:

first stage airfoil means; and, second stage airfoil means spaced from and generally parallel with said first stage airfoil means, said first stage airfoil means being positioned for intercepting said propulsive fluid stream from said manifold means and for reversing its flow direction, said second stage airfoil means being positioned for receiving said propulsive fluid stream from said first stage airfoil means and for discharging said propulsive fluid stream in an aft direction to thereby propel said vehicle in a forward direction.

13. Propulsion apparatus as set forth in claim 9, further comprising reversing means on said vehicle adjacent said plenum for selectively directing said propulsive fluid stream from said gas producer means so as to propel said vehicle in a reverse direction.

14. Propulsion apparatus as set forth in claim 13 wherein said reversing means comprises:

longitudinally extending reversing nozzle means rigidly mounted on said vehicle adjacent said plenum, said reversing nozzle means generally lying in a plane transverse of said first and second linear turbine means;

at least one closure door movable between an open position overlying said reversing nozzle means thereby closing off flow through said reversing nozzle means and directing said flow of said propulsive fluid stream through said first and second linear turbine means and a closed position overlying said first and second linear turbine means thereby closing off flow through said first and second linear turbine means and directing said flow of the propulsive fluid stream through said reversing nozzle means.

15. Propulsion apparatus as set forth in claim 14, further comprising:

linkage means operable for moving said closure door between said open and closed positions from a remote location; and actuator means for selectively operating said linkage means.

16. Propulsion apparatus as set forth in claim 3 wherein said linear turbine means includes multiple units of said first and second parallel, spaced apart, linear turbine assemblies.

17. Propulsion apparatus as set forth in claim 1, further comprising magnetic levitation means for laterally and vertically guiding said vehicle.

18. Propulsion apparatus as set forth in claim 1, further comprising wheel-on-rail means for laterally and vertically guiding said vehicle.

\* \* \* \* \*